No. 715,448. Patented Dec. 9, 1902.
F. R. WILLSON, Jr.
CONVEYER SHAFT HANGER.
(Application filed Apr. 17, 1900.)
(No Model.)
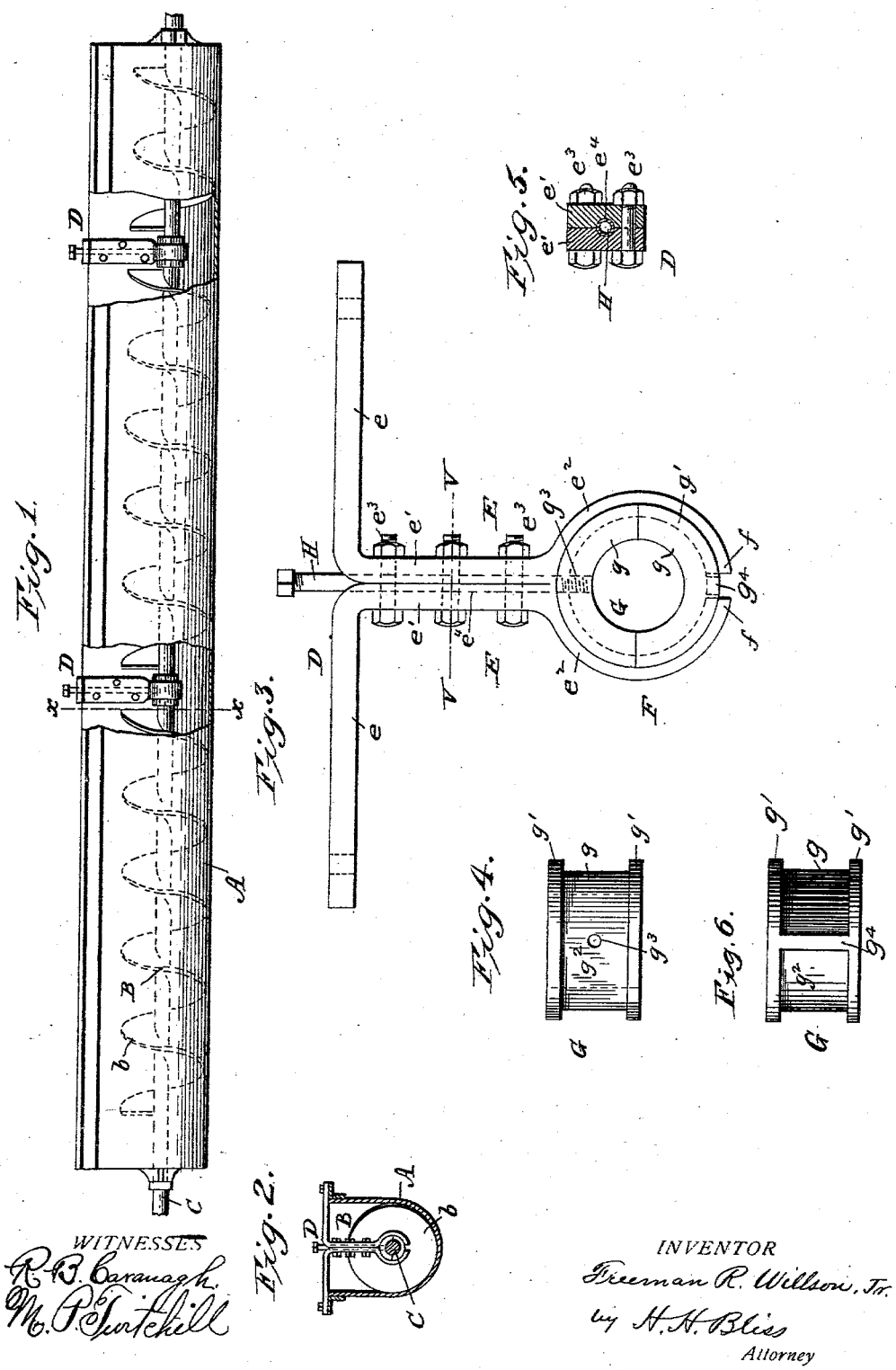
WITNESSES
INVENTOR
Freeman R. Willson, Jr.
by H. H. Bliss
Attorney

UNITED STATES PATENT OFFICE.

FREEMAN R. WILLSON, JR., OF COLUMBUS, OHIO, ASSIGNOR TO JOSEPH A. JEFFREY, OF COLUMBUS, OHIO.

CONVEYER-SHAFT HANGER.

SPECIFICATION forming part of Letters Patent No. 715,448, dated December 9, 1902.

Application filed April 17, 1900. Serial No. 13,262. (No model.)

*To all whom it may concern:*

Be it known that I, FREEMAN R. WILLSON, Jr., a citizen of the United States, residing at Columbus, in the county of Franklin and State of Ohio, have invented certain new and useful Improvements in Conveyer-Shaft Hangers, of which the following is a specification, reference being had therein to the accompanying drawings.

Figure 1 is a side elevation of a conveyer having devices constructed in accordance with my improvements. Fig. 2 is a cross-section on the line $x\ x$ of Fig. 1. Fig. 3 shows one of the hangers detached. Fig. 4 is a plan view of one of the inner face parts of the bushing. Fig. 5 is a cross-section of a vertical part of one of the hangers on line V V, Fig. 3. Fig. 6 is a bottom view of the bushing.

In the drawings, A indicates a box or trough such as is generally used in conveying apparatus of the class to which this invention relates.

B indicates the conveyer proper as a whole, it having a spirally-arranged blade $b$.

C indicates the shaft to which the blade parts are attached.

In using conveyers of this general class as heretofore constructed much difficulty has been experienced from the manner in which the shaft part is suspended. They are in many instances used for moving material along the trough or box, which is of such nature as to rapidly wear and cut the journal and bearing surfaces, and as the hangers have been heretofore made it has been difficult to form the bearing parts thereof of material which would resist wearing and cutting and also difficult to replace such parts after they had been worn. I have overcome these difficulties by constructing the parts in the way herein presented.

Each hanger as a whole is indicated by D. It is formed in two halves E E. Each half is produced by bending a bar of wrought metal in such way as to have the arm $e$, the vertical stem part or shank part $e'$, and the loop part $e^2$. The loop parts are shaped so as to conform approximately to the lines of circles, the center of each being the axis of the shaft which is to be suspended. The eye part or loop is indicated as a whole by F. It can be formed by properly bending a single piece of metal instead of employing two separate pieces, as above described.

The bearing proper is indicated by G. This also is preferably formed in two halves $g\ g$. It can be made exceedingly hard by the chilling process. It is relatively small as a whole, and when made in sections its components will be still smaller parts, and consequently can be readily and cheaply cast and subjected to the hardening process. As it requires some machine-work, it can be readily manipulated for this purpose. After the parts have been properly constructed and shaped they are put together in the way shown—that is to say, the two parts $g\ g$ of the bearing proper are brought together and are placed within the eye or loop F of the hanger, and the two shank parts $e'$ of the latter are then firmly fastened together by the bolts and nuts at $e^3$. The bushing or bearing part G is formed with flanges $g'$ at the ends of the part $g^2$, the latter being of a width equal to that of the eye or loop F. When the parts are assembled, the flanges $g'$ are outside of and bear against the edges of the loop F, and thus prevent any longitudinal displacement of the bushing. The latter is prevented from rotating by means of a fastening device, which is carried through the eye or loop and engages with the bushing. As shown, this is accomplished by the device which carries the oil to the interior of the bushing. A vertical aperture is formed in the shank of the hanger, and preferably this has the tube H inserted, long enough to extend the points above the arms E E. Provisions for the insertion of the tube can be readily made by forming a groove or passageway in the inner face of each shank part $e'$, as shown at $e^4$. The tube H is passed down the passage thus provided, and it being screw-threaded at the lower end is engaged with the threaded aperture at $g^3$ in the bushing, this aperture extending to the interior chamber of the bushing and serving to deliver the oil to the surface of the shaft. When the shaft of a spiral conveyer is suspended in this way, first, that part which is subjected to the wear can be made of metal, which is prepared and hardened, and, secondly, such wearing part can be readily removed and replaced when required without necessitating the replacing of the entire hanger.

One of the halves of the bushing G is provided with means whereby it is securely held from turning in the hanger, consisting of a longitudinal rib $g^4$, which lies between the lower opposing ends $f$ of the loop F of the hanger.

As has been hereinbefore stated, the shaft-hanger herein described and illustrated is particularly intended for use in combination with the shaft of a screw conveyer, and it is particularly adapted for such use from the fact that the depending stem or shank of the hanger is arranged directly above the center of the shaft, and the hanger has no laterally-extending parts which tend to interfere with the free movement of the material being acted upon longitudinally through the trough or box of the conveyer.

What I claim is—

1. A shaft-hanger composed of two parts divided in substantially the longitudinal plane of the hanger-shank, said parts being shaped to inclose the shaft-bearing, and means for securing said parts together, in combination with the shaft-bearing inclosed in said parts, substantially as set forth.

2. A shaft-hanger composed of two parts divided in substantially the longitudinal plane of the hanger-shank, said parts being shaped to inclose the shaft-bearing, and means above the bearing for securing said parts together, in combination with the shaft-bearing inclosed in said parts, substantially as set forth.

3. The combination of the two-part shaft-bearing, and the inclosing hanger formed of two separable parts, the parts of the hanger being separable on a plane substantially at right angles to the plane of separation of the bearing parts, substantially as set forth.

4. In a conveyer-shaft hanger, the combination of the suspending parts E, E, each formed with a vertical shank part $e'$, and a bottom loop part $e^2$, the bushing having radial projections $g'$, $g'$ engaging with the loops, means for fastening the shank parts and the loop parts together, and the oil-passage in the shank, substantially as set forth.

5. The combination of the bearing having the oil-feed opening $g^3$, an oil-duct H communicating with said opening, and a two-part hanger inclosing the bearing and inclosing said duct above the bearing.

6. The combination of the bearing having the rib $g^4$, and the two-part hanger having the loop portions $e^2$ embracing the bearing and abutting said rib and having the shank parts $e'$ at the other side of the bearing.

7. The combination of a conveyer-conduit, a longitudinal shaft therein, bearings for said shaft, and two-part separable hangers inclosing said bearings and supported on said conduit.

8. The combination of a conveyer-conduit, a longitudinal shaft therein above the conduit-bottom, bearings for said shaft, and hangers formed of separable parts engaging said bearings and extending upward therefrom, substantially as set forth.

In testimony whereof I affix my signature in presence of two witnesses.

FREEMAN R. WILLSON, JR.

Witnesses:
F. E. COTTON,
N. H. HIBBARD.